United States Patent Office 3,703,588
Patented Nov. 21, 1972

---

3,703,588
METHOD FOR IMPARTING ANTISTATIC PROPERTIES TO POLYMERIC MATERIALS
Norio Saito, Nara-ken, and Hiroshiro Kimura, Uji-shi, Japan, assignors to Norio Saito, Nara-ken, and Unitika Ltd., Hyogo-ken, Japan
No Drawing. Filed Nov. 21, 1969, Ser. No. 878,899
Int. Cl. D06m 13/50
U.S. Cl. 117—138.8 B     5 Claims

ABSTRACT OF THE DISCLOSURE

An organic tin compound of the formula:

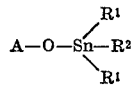

wherein A is a residue of monoalkyl phosphate, dialkyl phosphate, monoalkyl phosphite, dialkyl phosphite, alkanecarboxylic acid, alkanedicarboxylic acid, monoalkyl alkanedicarboxylate, alkenedicarboxylic acid, monoalkyl alkenedicarboxylate, arenecarboxylic acid, arenedicarboxylic acid, monoalkyl arenedicarboxylate, alkanesulfonic acid, arenesulfonic acid, arenedisulfonic acid, monoalkyl arenedisulfonate, or alkylsulfuric acid, and $R^1$ and $R^2$ are each alkyl, aryl or aralkyl, which is produced on polymeric materials to fix firmly thereon and imparts them excellent durable antistatic properties against both washing and dry-cleaning.

---

The present invention relates to novel organic tin compounds, and their production and use.

The organic tin compounds of the present invention are representable by the formula:

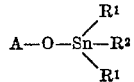  [I]

wherein A is a residue of monoalkyl phosphate, dialkyl phosphate, monoalkyl phosphite, dialkyl phosphite, alkanecarboxylic acid, alkanedicarboxylic acid, monoalkyl alkanedicarboxylate, alkenedicarboxylic acid, monoalkyl alkenedicarboxylate, arenecarboxylic acid, arenedicarboxylic acid, monoalkyl arenedicarboxylate, alkanesulfonic acid, arenesulfonic acid, arenedisulfonic acid, monoalkyl arenedisulfonate or alkylsulfuric acid, and $R^1$ and $R^2$ are each alkyl, aryl or aralkyl.

The number of carbon atoms in the moieties "alkyl," "alkane," "alkene," "aryl," "arene" and "aralkyl" hereinabove used do not exceed 20. Thus, the alkyl may be methyl, ethyl, propyl, butyl, isobutyl, t-butyl, pentyl, hexyl, octyl, nonyl, decyl or the like. Examples of the alkane are methane, ethane, propane, butane, hexane, octane, etc. As the alkene, there may be exemplified ethene, propene, butene, etc. The aryl includes phenyl, tolyl, xylyl, naphthyl, etc. Examples of the arene covers benzene, toluene, xylene, naphthalene and the like. The aralkyl may be, for instance, benzyl, phenethyl, phenylpropyl or tolylethyl. In general, at least one of A, $R^1$ and $R^2$ in the organic tin compounds [I] is preferred to be a relatively long chain, e.g. the one having not less than 8 carbon atoms.

It has now been found that the organic tin compounds [I] have excellent antistatic properties. It has also been found that they are entirely or almost insoluble in water and various organic solvents including the ones having high solvent power such as trichloroethylene. It has further been found that they can be readily produced on polymeric materials by the reaction between two specific reagents to fix firmly thereon and impart them durable antistatic properties. The present invention is based on these findings.

Accordingly, a basic object of the present invention is to embody the organic tin compounds [I]. Another object of this invention is to embody a process for preparing the organic tin compounds [I]. A further object of the invention is to embody a method for imparting polymeric materials excellent durable antistatic properties against both washing and dry-cleaning. A still further object of the invention is to embody polymeric materials imparted durable antistatic properties against both washing and dry-cleaning. These and other objects will be apparent to those conversant with the art to which the present invention pertains from the subsequent descriptions.

According to the present invention, the organic tin compound [I] can be normally produced by reacting a compound of the formula:

$$A\text{---}O\text{---}X \qquad [II]$$

wherein X is hydrogen, lower alkyl (e.g. methyl, ethyl, propyl) or ammonium and A is as defined above with a compound of the formula:

  [III]

wherein Y is hydrogen, lower alkanoyl (e.g. acetyl, propionyl) or a group of the formula:

and $R^1$ and $R^2$ are each as defined above.

Examples of the compound [II] are monomethyl phosphate, monoethyl phosphate, monobutyl phosphate, monooctyl phosphate, dimethyl phosphate, diethyl phosphate, dibutyl phosphate, dioctyl phosphate, dioctyl monomethyl phosphate, trimethyl phosphate, triethyl phosphate, tributyl phosphate, trioctyl phosphate, diethyl phosphite, dipropyl phosphite, dibutyl phosphite, diheptyl phosphite, pelargonic acid, lauric acid, myristic acid, palmitic acid, stearic acid, succinic acid, monomethyl succinate, monoethyl succinate, dimethyl succinate, diethyl succinate, monoammonium monomethyl succinate, maleic acid, monomethyl maleate, monoethyl maleate, dimethyl maleate, diethyl maleate, monoammonium monomethyl maleate, monoammonium monobutyl maleate, phthalic acid, monomethyl phthalate, monoethyl phthalate, monooctyl phthalate, dimethyl phthalate, dioctyl phthalate, naphthalenecarboxylic acid, methyl naphthalenecarboxylate, ethyl naphthalenecarboxylate, ammonium naphthalenecarboxylate, naphthalenedicarboxylic acid, monomethyl naphthalenedicarboxylate, ammonium butylsulfonate, ammonium laurylsulfonate, methyl octylsulfonate, ammonium octylsulfonate, toluenesulfonic acid, methyl benzenesulfonate, methyl toluenesulfonate, ethyl toluenesulfonate, methyl dodecylbenzenesulfonate, methyl naphthalenesulfonate, monomethyl naphthalenedisulfonate, monoethyl naphthalenedisulfonate, diethyl naphthalenedisulfonate, diammonium naphthalenedisulfonate, monoammonium monomethyl naphthalenedisulfonate, methyl octylsulfate, methyl laurylsulfate, etc.

As the compound [III], there may be exemplified trimethyltin hydroxide, triisopropyltin hydroxide, triisobutyltin hydroxide, triphenyltin hydroxide, tritolyltin hydroxide, bis(trimethyltin) oxide, bis(triethyltin) oxide, bis(triisobutyltin) oxide, bis(trioctyltin) oxide, trimethyltin acetate, triethyltin acetate, tributyltin acetate, trioctyltin acetate, 1,3-dioctyl tetraethyl distannoxane, 1,3-dilauryl tetrabutyl distannoxane, 1,3-myristyl tetrabutyl distannoxane, 1,3-dipalmityl tetrabutyl distannoxane, etc.

The reaction between the compounds [II] and [III] can proceed by solely mixing them but is normally carried out in an organic solvent (e.g. methanol, ethanol, benzene, toluene, xylene, ether, acetone, tetrahydrofuran) at room temperature or at a somewhat elevated temperature. In the simplest manner, the compounds [II] and [III] are mixed together in an organic solvent and the solvent is evaporated therefrom at room temperature or while warming so that the objective organic tin compound [I] is obtained.

For imparting polymeric materials antistatic properties by the use of the organic tin compound [I], there may be adopted various methods. For instance, polymeric materials are immersed in a dispersion of the organic tin compound [I] in water or an organic solvent (e.g. methanol, ethanol, benzene), if desired, in the presence of an emulsifier (e.g. polyethylene glycol alkyl ether, polyethylene glycol fatty acid ester, sorbitan fatty acid ester, fatty acid monoglyceride), nipped, dried at 90 to 120° C. for 15 seconds to 5 minutes and then cured at 150 to 210° C. for 15 seconds to 5 minutes to fix the organic tin compound [I] thereon. Further, for instance, polymeric materials are treated with the compounds [II] and [III] simultaneously or separately in a suitable medium (e.g. water, methanol, ethanol), if desired, in the presence of a surfactant such as polyethylene glycol ether, dried and, if necessary, cured so that the reaction proceeds between them to produce the organic tin compound [I] firmly fixed on the polymeric materials. In the most preferred manner, the operation is effected as follows:

At least one of the compound represented by the formulae:

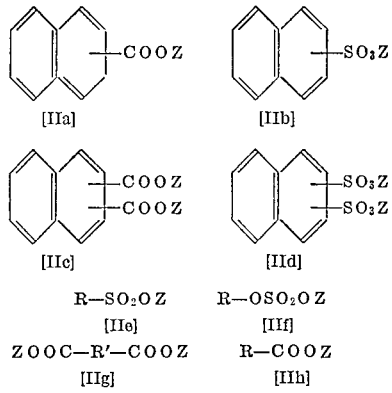

wherein R is alkyl, phenyl, alkylphenyl, phenylalkyl or alkylphenylalkyl, R' is alkylene having or not a double bond and Z is lower alkyl (e.g. methyl, ethyl, propyl) or ammonium, the number or carbon atoms in the said groups being not more than 20, and at least one of the compounds represented by the formulae:

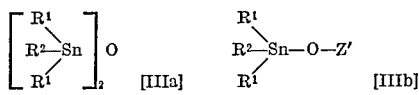

wherein Z' is lower alkanoyl (e.g. acetyl, propionyl) and $R^1$ and $R^2$ are each as defined above (the compound [IIIb] being prepared, for instance, by concentrating a mixture of the compound [IIIa] with an alkanoic acid under reduced pressure) are dispersed or dissolved in an appropriate medium (e.g. water, methanol, ethanol), if desired, in the presence of a surfactant (e.g. polyethylene glycol ether), and epoxy resin, methoxy nylon, vinyl acetate or the like is preferably added thereto. The resulting mixture is padded on polymeric materials, and the polymeric materials are nipped and dried. The drying may be carried out at room temperature, if necessary, at an elevated temperature which does not cause any unfavorable influence on the polymeric materials.

Apart from the above procedure, the following operation is favorably adopted for imparting antistatic properties to polymeric materials with the organic tin compound of the formula:

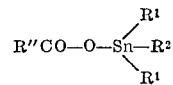

wherein R" is an alkyl group having 8 to 20 carbon atoms and $R^1$ and $R^2$ are each as defined above. Thus, polymeric materials are immersed in a solution or dispersion of polyethylene glycol fatty acid ester or sorbitan fatty acid ester in which the carbon atoms of the fatty acid moiety has 9 to 21 carbon atoms and the compound [IIIa] or [IIIb] in an appropriate medium (e.g. water, methanol, ethanol), if desired, in the presence of a surfactant, nipped and dried so as to produce the said organic tin compound thereon.

The thus obtained polymeric materials are imparted excellent durable antistatic properties against both washing and dry-cleaning.

The term "polymeric material" hereinabove used is intended to mean the material made of a polymer and includes fiber, film, molded article and other materials made of polyester, polymide, polyacrylonitrile or polyolefin.

Practical and presently preferred embodiments of the present invention are illustratively shown in the following examples wherein parts are by weight. In these examples, the electric resistance was measured as a test of the effectiveness of the treatment. It is known that the tendency to accumulate static charges may be determined by measuring the resistance of the article to be tested. It is also known that garments are almost non-susceptible to static charges upon wearing or generated static charges can leak away therefrom if they show a resistance less than $10^{10}$ ohm at 20° C., 65% relative humidity.

EXAMPLE 1

Triisobutyltin hydroxide (1 mol) and diisooctyl phosphate (1 mol) are dissolved in ethanol, and the solvent is removed from the resultant solution under an atmospheric pressure. The residue is crystallized from ethanol to give triisobutyltin diisooctyl phosphate as crystals melting at 85° C. in a quantitative yield.

The thus obtained triisobutyltin diisooctyl phosphate (1 part) is dispersed in water (100 parts) in the presence of non-ionic surfactant polyethylene glycol ether 2 parts). A fabric made of polycapramide is immersed in the resulting dispersion, nipped and dried in atmosphere. The electric resistance of the thus obtained fabric bearing 0.0025 to 0.0030 g. of the said compound per gram is $4.3 \times 10^9$ ohm, whereas that of the untreated fabric is more than $10^{12}$ ohm. Even after dry-cleaning five times with trichloroethylene at room temperature for 10 minutes, no material change in the electric resistance of the former fabric is seen. Thus, the fabric is imparted durable antistatic properties against dry-cleaning.

EXAMPLE 2

Triisobutyltin hydroxide (3.0 parts), diisooctyl phosphate (3.0 parts), non-ionic surfactant polyethylene glycol ether (12.0 parts) and water (285.0 parts) are mixed uniformly. A fabric made of polyethylene terephthalate is immersed in the resultant mixture, nipped to give a pickup of 40% and then dried in atmosphere. The electric resistance of the fabric is $7.0 \times 10^9$ ohm, whereas that of the untreated fabric is more than $10^{12}$ ohm. Even after washing several times with an amount of 50 times of 0.5% aqueous solution of soap at 60° C. for 1 hour, it shows an electric resistance of $8.2 \times 10^9$ ohm. Thus, the fabric is imparted durable antistatic properties against washing.

EXAMPLE 3

Triisobutyltin hydroxide (1 mol) and monoisooctyl o-phthalate (1 mol) are dissolved in ethanol, and the solvent is removed from the resultant solution under an atmospheric pressure. The residue is fractionally distilled to give triisobutyltin monoisooctyl o-phthalate as a fraction boiling at 165 to 172° C./9 mm. Hg in a quantitative yield.

The thus obtained triisobutyltin monoisooctyl o-phthalate is dispersed in water in the presence of non-ionic surfactant polyethylene glycol ether. A fabric made of polyethylene terephthalate is immersed in the resulting dispersion, nipped and dried in atmosphere. The electric resistance of the thus obtained fabric bearing 0.0020 to 0.0025 g. of the said compound per gram is $7.5 \times 10^9$ ohm, whereas that of the untreated fabric is more than $10^{12}$ ohm. Even after washing several times with an amount of 50 times of 0.5% aqueous solution of a synthetic detergent sodium dodecylbenzenesulfonate at 60° C. for 20 minutes, it shows an electric resistance of $9.0 \times 10^9$ ohm. Thus, the antistatic property of the fabric is very durable to repeated washings.

EXAMPLE 4

Triisobutyltin hydroxide (3.0 parts), 4-butylbenzenesulfonic acid (2.2 parts), non-ionic surfactant polyethylene glycol ether (10.0 parts) and water (2850.0 parts) are mixed uniformly. A fabric made of polycapramide is immersed in the resultant mixture at room temperature, nipped and dried. Then, it is repeatedly washed with an amount of 100 times of 0.5% aqueous solution of a synthetic detergent sodium dodecylbenzenesulfonate at room temperature and then rinsed with water. The electric resistance of the fabric bearing 0.0018 to 0.0020 g. of triisobutyltin 4-butylbenzenesulfonate per gram is $5.2 \times 10^9$ ohm, whereas that of the untreated fabric is more than $10^{12}$ ohm. Thus, the antistatic property of the fabric is very durable to washings.

EXAMPLE 5

Triisobutyltin hydroxide (1 mol) and triisooctyl phosphate (1 mol) are dissolved in ethanol, and the solvent is removed under an atmospheric pressure. The residue is crystallized from ethanol to give triisobutyltin diisooctyl phosphate as crystals melting at 85° C. in a quantitative yield. The thus obtained compound imparts excellent antistatic properties to polymeric materials.

EXAMPLE 6

Triisobutyltin hydroxide (1 mol) and diisooctyl o-phthalate (1 mol) are dissolved in ethanol, and the solvent is removed under an atmospheric pressure. The residue is fractionally distilled to give triisobutyltin monoisooctyl o-phthalate as a fraction boiling at 165 to 172° C./9 mm. Hg in a quantitative yield. The thus obtained compound imparts excellent antistatic properties to polymeric materials.

EXAMPLE 7

Triphenyltin hydroxide (1 mol) and methyl p-toluenesulfonate (1 mol) are dissolved in methanol, and the solvent is removed at room temperature under reduced pressure. The residue is crystallized from toluene to give triphenyltin p-toluenesulfonate as crystals melting at 152° C. in a quantitative yield. The thus obtained triphenyltin p-toluenesulfonate (1.0 part) is dispersed in water (90.0 parts) in the presence of non-ionic surfactant polyethylene glycol ether (9.0 parts). A fabric (0.3 part) made of polyethylene terephthalate is immersed in the resultant dispersion and dried in atmosphere so as to impart antistatic properties.

EXAMPLE 8

Triisobutyltin hydroxide (3.0 parts), methyl p-butylbenzenesulfonate (2.3 parts), non-ionic surfactant polyethylene glycol ether (10.0 parts) and water (2850.0 parts) are mixed uniformly. A fabric made of polyacrylonitrile is immersed in the resultant mixture at room temperature and dried at 75° C. The dried fabric is then washed 20 times with an amount of 100 times of 0.5% aqueous solution of a synthetic detergent sodium dodecylbenzenesulfonate at room temperature for 10 minutes and rinsed with water. After drying in atmosphere, there is obtained the fabric imparted antistatic properties caused by triisobutyltin p-butylbenzenesulfonate.

EXAMPLE 9

Triisobutyltin hydroxide (3.0 parts), triisooctyl phosphate (3.7 parts), non-ionic surfactant polyethylene glycol ether (12.0 parts) and water (285.0 parts) are mixed uniformly. A fabric made of polyethylene terephthalate is immersed in the resultant mixture, nipped to give a pick-up of 40% and then dried in atmosphere. The resultant fabric is imparted antistatic properties caused by triisobutyltin diisooctyl phosphate.

EXAMPLE 10

Diammonium naphthalene-1,5-disulfonate (2 parts) is dissolved in water to make 1.9% aqueous solution, which is adjusted to pH 8.5 with ammonia water. The aqueous solution is added to a mixture of bis(trioctyltin) oxide (3 parts) and non-ionic surfactant polyethylene glycol ether (20 parts), and then water is added thereto to make 500 parts. A fabric made of polycapramide is immersed in the resultant mixture at room temperature, nipped to give a pick-up of 80%, dried at room temperature in atmosphere and then heated at 135° C. for 3 minutes. It is then washed with water, dried at room temperature and then cured at 110° C. for 1 minute to give the fabric imparted antistatic properties caused by trioctyltin naphthalene-1,5-disulfonate.

EXAMPLE 11

Diammonium naphthalene-1,5-disulfonate (2 parts) is dissolved in water to make 1.9% aqueous solution, which is adjusted to pH 8.5 with ammonia water. The aqueous solution is added to a mixture of bis(trioctyltin) oxide (3 parts) and methanol (100 parts), and vinyl acetate (12 parts) and methanol (600 parts) are successively added thereto. A fabric made of polyacrylonitrile is immersed in the resultant mixture at room temperature, nipped to give a pick-up of 40%, dried in atmosphere and cured at 135° C. for 3 minutes. After washing with water, dried and heated at 110° C. for 1 minute, there is obtained the fabric imparted antistatic properties caused by trioctyltin naphthalene-1,5-disulfonate.

EXAMPLE 12

Diammonium naphthalene-1,5-disulfonate (2 parts) is dissolved in water to make 1.9% aqueous solution, which is adjusted to pH 9 with ammonia water. The aqueous solution is added to a mixture of trioctyltin acetate (3 parts) and non-ionic surfactant polyethylene glycol ether (12 parts), and then water is added thereto to make 500 parts. A fabric made of polyethylene terephthalate is immersed in the resultant mixture, nipped to give a pick-up of 80%, dried in atmosphere and heated at 135° C. for 3 minutes. After washing with water, dried and cured at 110° C. for 1 minute, there is obtained the fabric imparted antistatic properties caused by trioctyltin naphthalene-1,5-disulfonate.

EXAMPLE 13

Diammonium naphthalene-1,5-disulfonate (2 parts) is dissolved in water to make 1.9% aqueous solution, which is adjusted to pH 9 with ammonia water. The aqueous solution is added to a mixture of trioctyltin acetate (3 parts), methanol (100 parts) and methoxynylon (methanol-soluble nylon) (12 parts), and then methanol (600 parts) is added thereto. A fabric made of polycapramide is immersed in the mixture, nipped to give a pick-up of 40%, dried in atmosphere and cured at 135° C. for 3 minutes. After rinsing with water, dried and heated at 110° C. for 1 minute, there is obtained the fabric imparted antistatic properties caused by trioctyltin naphthalene-1,5-disulfonate.

EXAMPLE 14

Methyl ammonium succinate (2 parts) and bis(trioctyltin) oxide (1 part) are emulsified with polyethylene glycol (molecular weight, 220) oleyl ether (3 parts) and polyethylene glycol (molecular weight, 2,000) (3 parts) in water (600 parts). The thus obtained emulsion is padded on a fabric made of polyethylene terephthalate, and the fabric is nipped to give a pick-up of 70% and dried at 130° C. for 5 minutes. After rinsing with water, the fabric is dried and cured at 170° C. for 1 minute. The resultant fabric is imparted excellent durable antisfatic properties against both washing and dry-cleaning.

EXAMPLE 15

Polyethylene glycolyl monopalmitate (5 parts) and bis(trioctyltin) oxide (1 part) are dispersed in water (600 parts). The resultant dispersion is used as the emulsion employed in Example 14 for treatment of a fabric made of polyethylene terephthalate.

What is claimed is:

1. A method for imparting antistatic properties to a polymeric material selected from the group consisting of polyesters, polyamides, polyacrylonitriles and polyolefins which comprises coating an organic tin compound of the formula

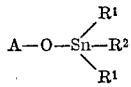

wherein A is a residue of monoalkyl phosphate, dialkyl phosphate, monoalkyl phosphite, dialkyl phosphite, alkanecarboxylic acid, alkanedicarboxylic acid, monoalkyl alkanedicarboxylate, alkenedicarboxylic acid, monoalkyl alkenedicarboxylate, arenecarboxylic acid, arenedicarboxylic acid, monoalkyl arenedicarboxylate, alkanesulfonic acid, arenesulfonic acid, arenedisulfonic acid, monoalkyl arenedisulfonate or alkylsulfuric acid and $R^1$ and $R^2$ are each alkyl, aryl or aralkyl on said polymeric material.

2. A method according to claim 1 wherein said coating is performed by reacting a compound of the formula:

A—O—X wherein X is hydrogen, lower alkyl or ammonium and A is as defined above with a compound of the formula:

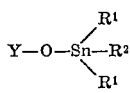

wherein Y is hydrogen, lower alkanoyl or a group of the formula:

and $R^1$ and $R^2$ are each alkyl, aryl or aralkyl, said reaction being carried out in the presence of said polymeric material, to produce a coating of said organic tin compounds on said polymeric material.

3. A method according to claim 1 wherein said organic tin compound is applied as a solution or dispersion to said polymeric material and is dried and cured to fix the organic tin compound on said polymeric material.

4. A method according to claim 1 wherein said coating is performed by reacting diammonium naphthalene 1,5-disulfonate with bis(trioctyltin)oxide, said reaction being performed in the presence of said polymeric material, and drying to produce a coating of said organic tin compound on said polymeric material.

5. A coated polymeric material produced by the process of claim 1.

References Cited

UNITED STATES PATENTS

| | | | |
|---|---|---|---|
| 3,296,193 | 1/1967 | Walsh et al. | 260—429.7 X |
| 3,305,442 | 2/1967 | Nishimoto et al. | 260—429.7 X |
| 3,376,328 | 4/1968 | Davies | 260—429.7 |
| 3,441,953 | 4/1969 | Dumont | 117—139.5 CQ |
| 3,446,651 | 5/1969 | Clachan et al. | 117—138.8 F X |
| 2,953,479 | 9/1960 | Heyden et al. | 117—139.5 CQ X |
| 2,957,785 | 10/1960 | Leatherland | 117—143 R X |
| 3,108,010 | 10/1963 | Nakane et al. | 117—138.8 N X |

RALPH HUSACK, Primary Examiner

U.S. Cl. X.R.

117—138.8 E, 138.8 F, 138.8 N, 138.8 UA, 139.5 CQ; 252—8.6; 260—429.7